3,342,333
APPARATUS FOR THIN-LAYER
CHROMATOGRAPHY
Friedrich Geiss, Laveno, and Helmut Schlitt, Masnago, Italy, assignors to European Atomic Energy Community-Euratom, Brussels, Belgium
Filed Dec. 26, 1963, Ser. No. 333,582
Claims priority, application Germany, Jan. 11, 1963, E 17,696
11 Claims. (Cl. 210—94)

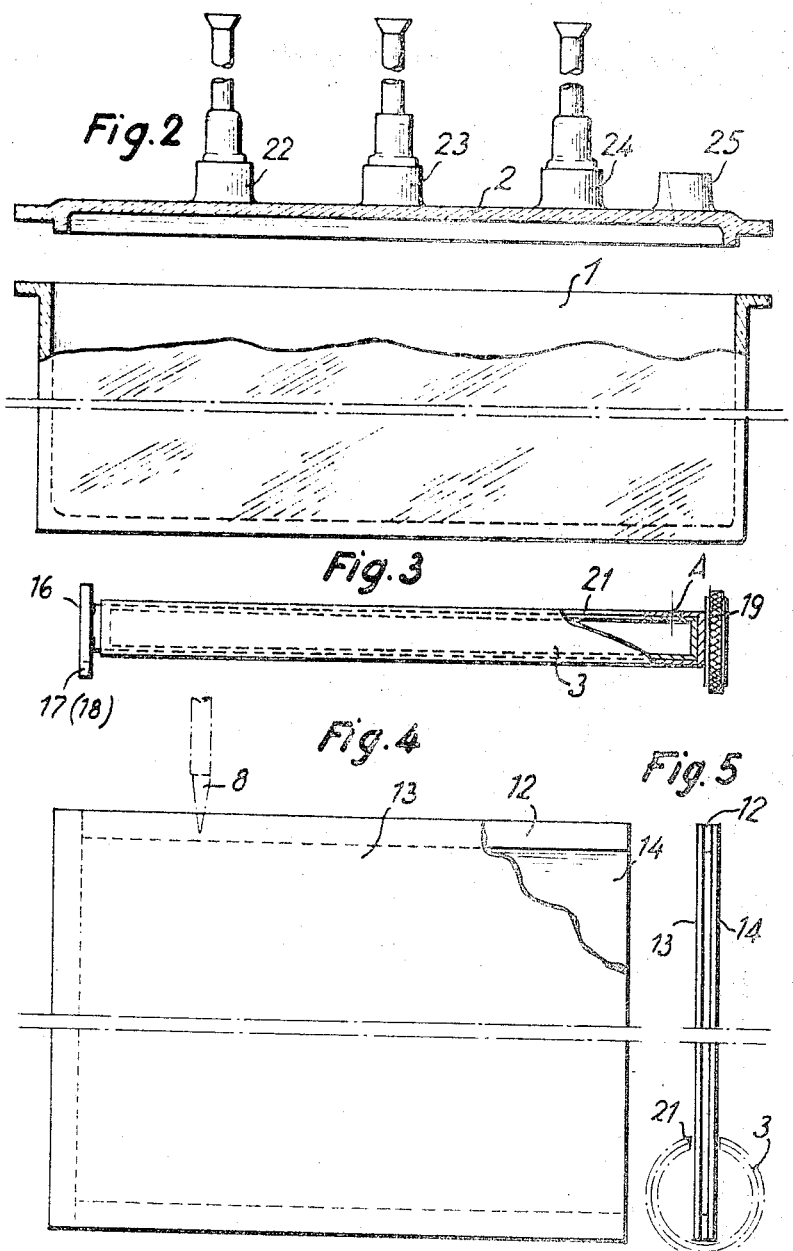

This invention relates to a method and an appartus to be used in thin-layer chromatography.

In applicants' Belgian Patent No. 625,013 of Nov. 19, 1962, there is described a process for the manufacture of plates for use in thin-layer chromatography, said process being based on the idea that the plates must be air conditioned in order to obtain reproducible results during their use, i.e. their development.

The principal object of the instant invention is to provide a method enabling to carry out this air-conditioning in a practical manner.

A further object of the invention resides in the provision of a method to effect simultaneously the air-conditioning and the developing of the plates for thin-layer chromatography.

A still further object of the present invention is to provide an apparatus that would enable to carry out the above indicated methods.

In order to obtain reproducible results in thin-layer chromatography, it is not only necessary to use the plates, which have been air-conditioned, at the same relative humidity as that at which they were so conditioned, after application of adsorbent and drying but, furthermore, it is necessary to take care in maintaining identical climatic conditions during the development of said plates.

During the formation of layers in thin-layer chromatography and during their development, the relative humidity exerts a decisive influence on the separation results and thereafter on their reproducibility. It is also impossible to introduce directly into an air-conditioned chamber the produced layers, previously exposed to certain atmospheric conditions, and simply to develop them therein, because the time required for the establishment of equilibrium with regard to relative humidity is longer than that necessary for the development itself. It is therefore necessary to maintain the treated plate material in the same chamber without opening, in the meantime, the covers, air-lock, etc. and to allow it to reach an equilibrium with an atmosphere defined by the temperature, the relative humidity and eventually the vapor pressure of the eluant employed, and then to start the development of the plates, for instance, by partially immersing them in a suitable eluant. During the development, the climatic conditions can be maintained constant or still they can be varied.

Thus, the invention is characterized by the combination of a required preliminary air-conditioning, the maintaining of the chosen climatic conditions and a development in the same air-conditioned chamber.

The invention and particularly the novel apparatus will now be described in detail with reference to the accompanying drawings in which:

FIGS. 2 to 5 represent detail views of the apparatus shown in FIG. 1, namely:

FIG. 2 is a front elevation view, partly in section, of the air-conditioning chamber with cover;

FIG. 3 is a longitudinal elevation view, partly in cross-section, of the tubular tank intended to receive the eluant;

Figure 1:
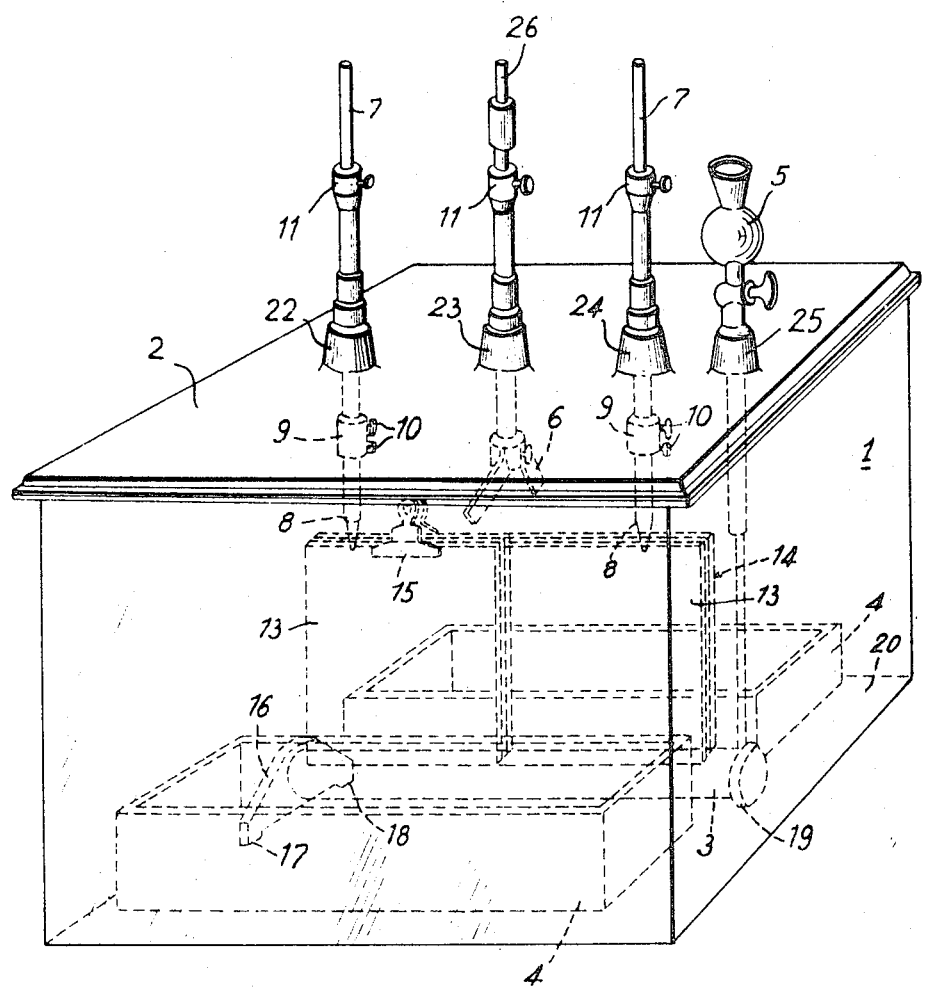
FIG. 1 is a perspective view of the entire apparatus according to the instant invention.
Figure 6:
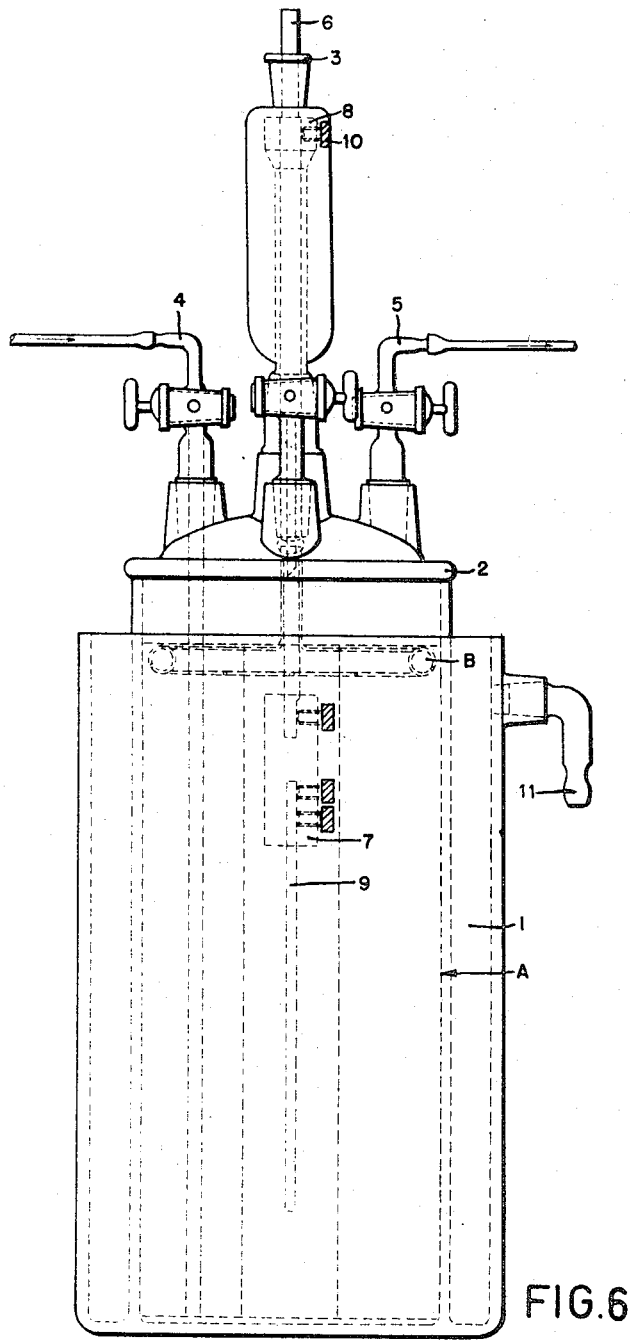

FIG. 4 is a side elevation view, partly in section, of the flat chamber with part of the cone or wedge that can be interposed in the unfolding joint of this chamber; and FIG. 5 is a cross-sectional view of the flat chamber, as shown in FIG. 4, and of the elution tank; and FIG. 6 represents, partly in section, a side elevation view of another apparatus that can be used to carry out the method according to the instant invention.

In FIGS. 1 to 5, the tubular elution tank 3 is provided at one end with a bearing member 16 which rests by means of portions 17 and 18 on the bottom 20 of the air-conditioning chamber 1. At the other end, the tubular tank 3 comprises a milled flange 19 resting on the bottom of the air-conditioning chamber. Preferably, the air-conditioning chamber 1 including its cover 2 are made of glass. Furthermore, according to a preferred arrangement the air-conditioning chamber 1 is made in the form of a box and comprises containers 4 provided with a desiccant, such as sulfuric acid, required for the air-conditioning. In a slot 21, made through the top of the elution tank, there is inserted a frame plate 14 provided with spacing strips 12 and forming a flat chamber with a thin-layer chromatography plate 13, the latter being normally predried and provided with an adsorbent. The dimensions of the plate 13 are usually 200 x 200 or 200 x 400 mm. The flat chamber is kept folded by means of a spring clamp 15.

The cover 2 is provided with openings 22 to 25 for the reception of two rods 7, a shaft 26 and a stop-cock funnel 5. The rods 7 are connected by means of sleeve 9, provided with locking screws 10, to the wedges or cones 8, for instance, made of polytetrafluoroethylene. When these rods slide downwards, the wedges become interposed in the unfolding joint of the plates 13 and 14 thereby opening the flat chamber and permitting to the atmosphere of the air-conditioning chamber to enter into the flat chamber and to reach the adsorbent. Shaft 26 is provided with a bladed stirrer 6 and the stop-cock funnel 5 serves to supply the eluant to the tank 3.

The apparatus according to FIGS. 1 to 5 operates in the following manner:

A thin-layer chromatography plate, normally predried and provided with substances to be separated, is covered with the frame plate 14 and held therewith by means of clamp 15. The entire assembly is then inserted through the slot 21 into the tubular tank 3 which is positioned in the chamber 1. Then, this chamber 1 is closed with cover 2. If plates with dimensions of 200 x 200 mm. are used, only one of the cones or wedges is driven between the plates in order to allow the desired atmosphere to come into contact with the adsorbent; with other plates both cones or wedges are used. Preferably, stirrer 6 is also operated. When the adsorbent has been air-conditioned, the wedges are removed and the eluant is introduced into the tubular tank 3 by means of stop-cock funnel 5. Aperture A (see FIG. 3) is used for this purpose.

The alternative apparatus of FIG. 6 is formed as follows:

The air-conditioning chamber 1 is preferably made of glass and is provided with a cover 2 having four openings intended respectively for a stop-cock funnel 3, gas inlet and outlet tubes 4 and 5, with stop-cocks, and a rod 6 with a coupling sleeve 7, for instance of polytetrafluoroethylene, said rod being adapted to be connected at the bottom end thereof with the thin-layer chromatography plate 9 which is suspended thereon. The rod is held in position by means of a sleeve 8 provided with a screw 10. The stop-cock funnel 3 is connected with a perforated glass ring B enabling to wet with the eluant the filter paper A hung against the inner wall of the air-conditioning chamber. Reference numeral 11 represents an overflow for a thermostatic liquid which can be circulated along the outer wall of the chamber.

The apparatus according to FIG. 6 operates as follows:

The substances to be separated are applied onto the normally predried plate 9 which is suspended in the air-conditioning chamber so as not to touch the bottom thereof. Then, dry nitrogen can be forced into the chamber through 4 or humid air can be sucked in through 5 until desired atmospheric conditions are achieved. Preferably, the sucked in air is first passed through a washing bottle containing sulphuric acid of such concentration as to obtain desired climatic conditions. The relative humidity in the chamber can be measured by means of a hygrometer (not shown). When the desired atmospheric conditions have been reached in the chamber, the filter paper is wetted with the eluant. Approximately 5 minutes later, when the atmosphere of the chamber is saturated with the eluant vapor, the plate is immersed into the eluant at the bottom of the chamber by loosening the screw 10. The desired temperature is obtained by circulating a thermostatic liquid in a closed circuit through the outer jacket of the chamber 1.

It should, of course, be understood that the invention is not limited to the specific embodiments described above but that different modifications evident to those skilled in the art can be made without departing from the spirit of the invention and the scope of the following claims.

We claim:

1. An apparatus for use in thin-layer chromatography separations with reproducible results comprising: a closed air-conditioning chamber in which desired climatic conditions can be formed, said chamber consisting of a box-like housing and a cover; container means in said chamber with a desiccant allowing to form said desired climatic conditions; an elution tank in said chamber provided with an opening through its top; a flat chamber formed by a thin-layer chromatography plate and a frame plate held one against the other and capable of being opened, said flat chamber being inserted in said elution tank through its top opening; means operable from the outside of said closed air-conditioning chamber adapted to unfold the thin-layer chromatography plate and the frame plate thus opening the flat chamber; and means for introducing the eluant into the elution tank.

2. Apparatus as claimed in claim 1 further comprising stirring means operable from the outside of the air-conditioning chamber and adapted to force air-circulation within said chamber.

3. Apparatus as claimed in claim 1 in which at least the air-conditioning chamber is made of glass.

4. Apparatus as claimed in claim 1 in which said cover of the air-conditioning chamber is provided with apertures for positioning means adapted to open the flat chamber and means adapted to introduce the eluant into the elution tank.

5. Apparatus as claimed in claim 1 in which the elution tank is of a tubular shape.

6. Apparatus as claimed in claim 1 in which the means for opening the flat chamber consist of at least one cone or wedge made of polytetrafluoroethylene and connected to a rod leading to the outside of the chamber and the means for introducing the eluant into the elution tank consist of a stop-cock funnel.

7. An apparatus for use in thin-layer chromatography separations with reproducible results comprising a closed air-conditioning chamber in which desired climatic conditions can be formed; gas inlet and outlet means leading into said chamber and intended to form therein the desired climatic conditions; a suspending rod adapted to be connected with a thin-layer chromatography plate so that the latter can hang in said chamber without touching the bottom thereof; filter paper hung against the inner walls of said chamber; means to wet said filter paper with an eluant; and means to lower the thin-layer chromatography plate until it reaches the bottom of said chamber.

8. Apparatus as claimed in claim 7, in which said chamber is made of glass.

9. Apparatus as claimed in claim 7, in which the chamber consists of a container and a cover, said cover being provided with openings for connection of the gas inlet and outlet means and positioning of the supporting rod as well as of the means for introducing the eluant to wet the filter paper.

10. Apparatus as claimed in claim 7 further comprising a perforated ring within said chamber connected to the means for introduction of the eluant and enabling to wet the filter paper with said eluant.

11. Apparatus as claimed in claim 7, in which the chamber is provided with an outer jacket for circulation of a thermostatic liquid adapted to maintain the temperature within the chamber at a desired level.

References Cited

UNITED STATES PATENTS

| 3,189,541 | 6/1965 | Brenner et al. | 210—31 |
| 2,214,024 | 10/1965 | Shandon | 210—189 |

OTHER REFERENCES

Consden et al.: Technique of Organic Chemistry, Adsorption and Chromatography, vol. V, Harold G. Cassidy, 1951, Interscience Publishers, Inc., New York, pp. 302–303, relied upon.

JOSEPH SCOVRONEK, *Acting Primary Examiner.*

MORRIS O. WOLK, *Examiner.*

E. G. WHITBY, *Assistant Examiner.*